(12) United States Patent
Yao et al.

(10) Patent No.: US 11,181,434 B2
(45) Date of Patent: Nov. 23, 2021

(54) LEAKAGE INSPECTION DEVICE

(71) Applicant: DENSO CORPORATION, Kariya (JP)

(72) Inventors: Takayuki Yao, Kariya (JP); Toshitaka Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 16/789,642

(22) Filed: Feb. 13, 2020

(65) Prior Publication Data

US 2020/0182733 A1 Jun. 11, 2020

Related U.S. Application Data

(63) Continuation of application No. PCT/JP2018/026435, filed on Jul. 13, 2018.

(30) Foreign Application Priority Data

Sep. 21, 2017 (JP) .............................. JP2017-180939

(51) Int. Cl.
*G01M 3/02* (2006.01)

(52) U.S. Cl.
CPC ..................... *G01M 3/02* (2013.01)

(58) Field of Classification Search
CPC ............ G01M 3/00; G01M 3/02; G01M 3/20; G01M 3/202; G01M 3/226; G01M 3/229; G01M 3/3281; G01M 3/329

(Continued)

(56) References Cited

U.S. PATENT DOCUMENTS

| | | | | |
|---|---|---|---|---|
| 2,853,540 A | * | 9/1958 | Camilli | H01F 27/20 174/17 GF |
| 3,174,329 A | * | 3/1965 | Kauffman | G01M 3/229 73/40.7 |

(Continued)

FOREIGN PATENT DOCUMENTS

JP H10300626 A 11/1998
JP 3203528 B2 8/2001

(Continued)

OTHER PUBLICATIONS

Fukuda, "Hydrogen Leak Test System, HDS-0100 series", Fukuda Test Environment Solution, Product Brochure, published on Oct. 17, 2013, 12 pages (with English Translation).

(Continued)

*Primary Examiner* — David A. Rogers
(74) *Attorney, Agent, or Firm* — Harness, Dickey & Pierce, P.L.C.

(57) ABSTRACT

A leakage inspection device includes an inspection chamber in which an inspection object is disposed to be filled with a tracer gas, and a circulation passage which connects a suction port disposed in the inspection chamber and a blowout port disposed at a position away from the suction port in the inspection chamber with each other. The leakage inspection device includes a blower disposed in the circulation passage to circulate gas by sucking from the inspection chamber through the suction port and by blowing out from the blowout port. The leakage inspection device includes a detector configured to detect the tracer gas leaked from the inspection object and contained in the gas flowing through the circulation passage at a position separated by a predetermined distance or more from the blower toward the blowout port in the circulation passage.

4 Claims, 5 Drawing Sheets

(58) Field of Classification Search
USPC .................................................. 73/40–49.8
See application file for complete search history.

(56) References Cited

U.S. PATENT DOCUMENTS

| | | | | | |
|---|---|---|---|---|---|
| 3,364,729 | A * | 1/1968 | Yearwood | ............ | F17C 13/126 73/40.7 |
| 3,572,096 | A * | 3/1971 | Meyer | ................. | G01M 3/229 73/40.7 |
| 3,577,769 | A * | 5/1971 | Roberts | ............... | G01M 3/229 73/40.7 |
| 3,729,983 | A * | 5/1973 | Coppens | .............. | G01M 3/229 73/40.7 |
| 3,738,158 | A * | 6/1973 | Farrell | ................. | G01M 3/329 73/40.7 |
| 3,762,212 | A * | 10/1973 | Morley | ................ | G01M 3/202 73/40.7 |
| 4,103,919 | A * | 8/1978 | Greenheck | ........... | B62B 5/0083 280/79.4 |
| 4,754,638 | A * | 7/1988 | Brayman | ............... | G01M 3/20 73/40.7 |
| 4,813,268 | A * | 3/1989 | Helvey | ................ | G01M 3/205 73/40.7 |
| 4,938,056 | A * | 7/1990 | DeRudder | .......... | B60C 23/0408 73/146 |
| 5,010,761 | A * | 4/1991 | Cohen | .................. | G01M 3/229 73/40.7 |
| 5,105,654 | A * | 4/1992 | Maruyama | ............ | G01M 3/363 73/49.3 |
| 5,128,269 | A * | 7/1992 | Oitate | ............... | G01R 31/1254 436/126 |
| 5,170,660 | A * | 12/1992 | Lehmann | ............. | B07C 5/3408 73/49.3 |
| 5,172,583 | A * | 12/1992 | Tallon | ................... | G01M 3/202 73/40.7 |
| 5,386,717 | A * | 2/1995 | Toda | ...................... | G01M 3/202 348/E5.105 |
| 5,553,483 | A * | 9/1996 | Armentrout | ......... | G01M 3/229 73/40 |
| 6,050,133 | A * | 4/2000 | Achter | ...................... | A61L 2/28 73/40.7 |
| 6,314,794 | B1 * | 11/2001 | Seigeot | ................ | G01M 3/228 73/40 |
| 6,354,138 | B1 * | 3/2002 | Ascheman | ......... | G01N 15/0826 73/1.06 |
| 6,851,316 | B2 * | 2/2005 | Micke | .................... | G01M 3/02 73/40 |
| 7,012,678 | B2 * | 3/2006 | Enomoto | .......... | B01D 46/0086 356/237.1 |
| 7,210,337 | B1 * | 5/2007 | Jarrett | ................ | G01M 3/3281 73/49.3 |
| 7,448,256 | B2 * | 11/2008 | Jenneus | ................ | G01M 3/226 73/49.2 |
| 7,516,649 | B2 * | 4/2009 | Locke | .................... | G01M 3/28 454/237 |
| 7,614,280 | B1 * | 11/2009 | Gardner | ................ | A62B 27/00 73/38 |
| 7,707,871 | B2 * | 5/2010 | Lukens | ................. | G01M 3/229 73/49.2 |
| 7,788,967 | B2 * | 9/2010 | Golding | ................ | G01M 3/226 73/40.5 A |
| 8,151,630 | B1 * | 4/2012 | Gardner | ................ | A62B 27/00 73/40 |
| 9,188,501 | B2 * | 11/2015 | Grosse Bley | ......... | G01M 3/042 |
| 2004/0144161 | A1 * | 7/2004 | Micke | ..................... | G01M 3/02 73/40.7 |
| 2006/0065043 | A1 * | 3/2006 | Cummings | ........... | G01M 3/229 73/40.7 |
| 2007/0084270 | A1 * | 4/2007 | Jarrett | ................ | G01M 3/3281 73/49.2 |
| 2007/0157704 | A1 * | 7/2007 | Jenneus | ................ | G01M 3/226 73/40.7 |
| 2008/0060421 | A1 * | 3/2008 | Muller | .................... | G01M 3/229 73/49.2 |
| 2008/0314774 | A1 * | 12/2008 | Granadino | ........... | G01M 3/226 206/216 |
| 2009/0100909 | A1 * | 4/2009 | Grosse Bley | ......... | G01M 3/229 73/40.7 |
| 2009/0113995 | A1 * | 5/2009 | Golding | ................ | G01M 3/229 73/40.7 |
| 2009/0173144 | A1 * | 7/2009 | Lukens | ................. | G01M 3/229 73/40.7 |
| 2009/0277249 | A1 | 11/2009 | Polster et al. | | |
| 2011/0056274 | A1 * | 3/2011 | Bunod | .................. | G01M 3/229 73/40 |
| 2011/0113861 | A1 * | 5/2011 | Maehira | .............. | G01M 3/229 73/40.7 |
| 2011/0113862 | A1 * | 5/2011 | Maehira | .............. | G01M 3/229 73/40.7 |
| 2012/0260722 | A1 * | 10/2012 | McGregor | ........... | G01M 3/207 73/40.7 |
| 2015/0308916 | A1 * | 10/2015 | Nelles | .................... | G01M 3/042 73/40.7 |
| 2017/0299459 | A1 * | 10/2017 | Spartz | .................... | G01M 3/202 |
| 2021/0048365 | A1 * | 2/2021 | Lundin | ................. | G01M 3/229 |

FOREIGN PATENT DOCUMENTS

JP     2008209220 A     9/2008
JP     2010516998 A     5/2010

OTHER PUBLICATIONS

INFICON, "Leak Detection with Hydrogen", INFICON AB, Product Brochure. Linköping, Sweden, retrieved from the Internet: Jul. 28, 2017 (8 pages) (with English Translation).

* cited by examiner

FIG. 5 a# LEAKAGE INSPECTION DEVICE

CROSS REFERENCE TO RELATED APPLICATION

The present application is a continuation application of International Patent Application No. PCT/JP2018/026435 filed on Jul. 13, 2018, which designated the U.S. and claims the benefit of priority from Japanese Patent Application No. 2017-180939 filed on Sep. 21, 2017. The entire disclosures of all of the above applications are incorporated herein by reference.

TECHNICAL FIELD

The present disclosure relates to a leakage inspection device and a leakage inspection method for inspecting airtightness of an inspection object having an airtight space using a tracer gas.

BACKGROUND

Conventionally, a leakage inspection device and a leakage inspection method using the leakage inspection device have been used in order to secure airtightness of an industrial product having a space that requires a predetermined airtightness.

SUMMARY

In one aspect of the present disclosure, a leakage inspection device includes:

an inspection chamber in which an inspection object is disposed to be filled with a tracer gas;

a circulation passage connecting a suction port disposed in the inspection chamber and a blowout port disposed at a position away from the suction port in the inspection chamber with each other;

a blower disposed in the circulation passage to circulate gas by sucking from the inspection chamber through the suction port and by blowing out from the blowout port; and a detector configured to detect the tracer gas leaked from the inspection object and contained in the gas flowing through the circulation passage at a position separated by a predetermined distance or more from the blower toward the blowout port in the circulation passage.

In one aspect of the present disclosure, a leakage inspection method is for the leakage inspection device, and including:

arranging the inspection object inside the inspection chamber;

filling inside of the inspection object with the tracer gas;

circulating gas inside the inspection chamber through the circulation passage by the operation of the blower;

detecting the tracer gas by the detector, which is contained in the gas flowing through the circulation passage in a state where the filling of the tracer gas into the inspection object and the circulation of the gas through the circulation passage by the operation of the blower are continued; and determining that the inspection object passes the leakage inspection when a predetermined determination condition is satisfied using the tracer gas detected by the detector.

DETAILED DESCRIPTION

To begin with, examples of relevant techniques will be described.

Conventionally, a leakage inspection device and a leakage inspection method using the leakage inspection device have been used in order to secure airtightness of an industrial product having a space that requires a predetermined airtightness.

After an inspection object is placed in an inspection chamber, a gas is sealed inside the inspection object, and a differential pressure leakage inspection is performed. When the enclosed gas is exhausted to outside of the inspection object at the end of the differential pressure leakage inspection, the inside of the inspection chamber is brought to atmospheric pressure, and a tracer gas (that is, helium gas) is enclosed inside the inspection object at a predetermined pressure. After stirring the gas in the inspection chamber in this state, the tracer gas is detected relative to gas collected from the inspection chamber to inspect whether or not there is a leak in the inspection object.

However, many operations and much time will be required to finish the leakage inspection using the tracer gas due to the process of enclosing and discharging the gas with respect to the inspection object.

Further, the inspection object is fixed at a predetermined position inside of the inspection chamber. A detection unit detects the tracer gas in the gas collected from a specific position in the inspection chamber, and inspects for a leak in the detection target using the detection result.

Therefore, there is a concern that the positional relationship between the position of the leak in the inspection object and the detection position in the detection unit affects the detection accuracy of the tracer gas. Thus, the inspection accuracy of the leakage inspection is affected by the positional relationship. For this reason, the gas is stirred in the inspection chamber with a fan for homogenization of the tracer gas in the gas.

However, in the case of stirring the inside of the inspection chamber with a fan, a sufficiently long time is required to uniformly stir the tracer gas. Alternatively, in order to shorten the stirring time, it is necessary to limit the volume to be stirred to a small size. In this case, the size of the inspection object and the inspection chamber is limited.

For example, if the inspection chamber is too large for the inspection object to be inspected, the volume of gas that needs to be stirred may be large, and the distribution of tracer gas in the inspection chamber may be uneven. In this case, since the detection result of the tracer gas by the detection unit greatly fluctuates, the inspection accuracy of the leakage inspection largely fluctuates.

That is, in order to secure a certain inspection accuracy, it is necessary to strictly limit the size of the inspection object, which lacks versatility.

The present disclosure relates to a leakage inspection device and a leakage inspection method for inspecting airtightness of an inspection object, to cope with inspection objects of various sizes, and to realize a predetermined accuracy or more with a simple configuration.

In one aspect of the present disclosure, a leakage inspection device includes:

an inspection chamber in which an inspection object is disposed to be filled with a tracer gas;

a circulation passage connecting a suction port disposed in the inspection chamber and a blowout port disposed at a position away from the suction port in the inspection chamber with each other;

a blower disposed in the circulation passage to circulate gas by sucking from the inspection chamber through the suction port and by blowing out from the blowout port; and a detector configured to detect the tracer gas leaked from the inspection object and contained in the gas flowing through the circulation passage at a position separated by a predetermined distance or more from the blower toward the blowout port in the circulation passage.

According to the leakage inspection device, the gas in the inspection chamber including the tracer gas leaked from the inspection object is circulated by the blower through the inspection chamber and the circulation passage, so the tracer gas can be made to pass around the detector.

Thereby, if the inspection object can be placed inside the inspection chamber, the leakage inspection device can perform a leakage inspection of the inspection object since the detector can detect the tracer gas while the influence of the size of the inspection object can be suppressed. That is, the leakage inspection device can perform the leakage inspection of the inspection object of various sizes.

Moreover, according to the leakage inspection device, since the blower is arranged in the circulation passage, the gas inside the inspection chamber drawn from the suction port can be stirred by the blower. Furthermore, since the detector detects the tracer gas at a position separated by a predetermined distance or more from the blower toward the blowout port, the tracer gas can be detected in a state where the stirring of gas blown by the blower is further advanced.

That is, according to the leakage inspection device, the gas in the stirred state can be blown to the detector so that the distribution of the tracer gas becomes uniform. Therefore, the influence of the size of the inspection object on the inspection chamber can be suppressed, and the detection accuracy of the detector and the inspection accuracy of the leakage inspection can be maintained at a certain level or more.

In one aspect of the present disclosure, a leakage inspection method is for a leakage inspection device including:

an inspection chamber in which an inspection object is disposed to be filled with a tracer gas;

a circulation passage connecting a suction port disposed in the inspection chamber and a blowout port disposed at a position away from the suction port in the inspection chamber with each other;

a blower disposed in the circulation passage to circulate gas by sucking from the inspection chamber through the suction port and by blowing out from the blowout port; and a detector configured to detect the tracer gas leaked from the inspection object and contained in the gas flowing through the circulation passage at a position separated by a predetermined distance or more from the blower toward the blowout port in the circulation passage.

The leakage inspection method includes:

arranging the inspection object inside the inspection chamber;

filling inside of the inspection object with the tracer gas;

circulating gas inside the inspection chamber through the circulation passage by the operation of the blower;

detecting the tracer gas by the detector, which is contained in the gas flowing through the circulation passage in a state where the filling of the tracer gas into the inspection object and the circulation of the gas through the circulation passage by the operation of the blower are continued; and determining that the inspection object passes the leakage inspection when a predetermined determination condition is satisfied using the tracer gas detected by the detector.

Since the leakage inspection method includes the arrangement step, the gas filling step, the circulation step, the detection step, and the determination step using the above-described leakage inspection device, it is possible to perform a leakage inspection having a predetermined accuracy or more while suppressing the influence of the size of the inspection object inside the inspection chamber.

According to the leakage inspection method, in the detection step, the detector detects the tracer gas in the state where the filling of the tracer gas to the inspection object and the circulation of the gas through the circulation passage by the operation of the blower are continued. Therefore, the leakage inspection can be performed without involving complicated processes such as replacement of gas inside the inspection object and adjustment of internal pressure of the inspection object.

Furthermore, according to the leakage inspection method, the required time of the leakage inspection with respect to one inspection object can be shortened by enabling the leakage inspection without involving a complicated process.

Hereinafter, an embodiment will be described with reference to the drawings. In the following embodiments, portions that are identical or equivalent to each other are denoted by the same reference numerals in the drawings.

Figure 1:
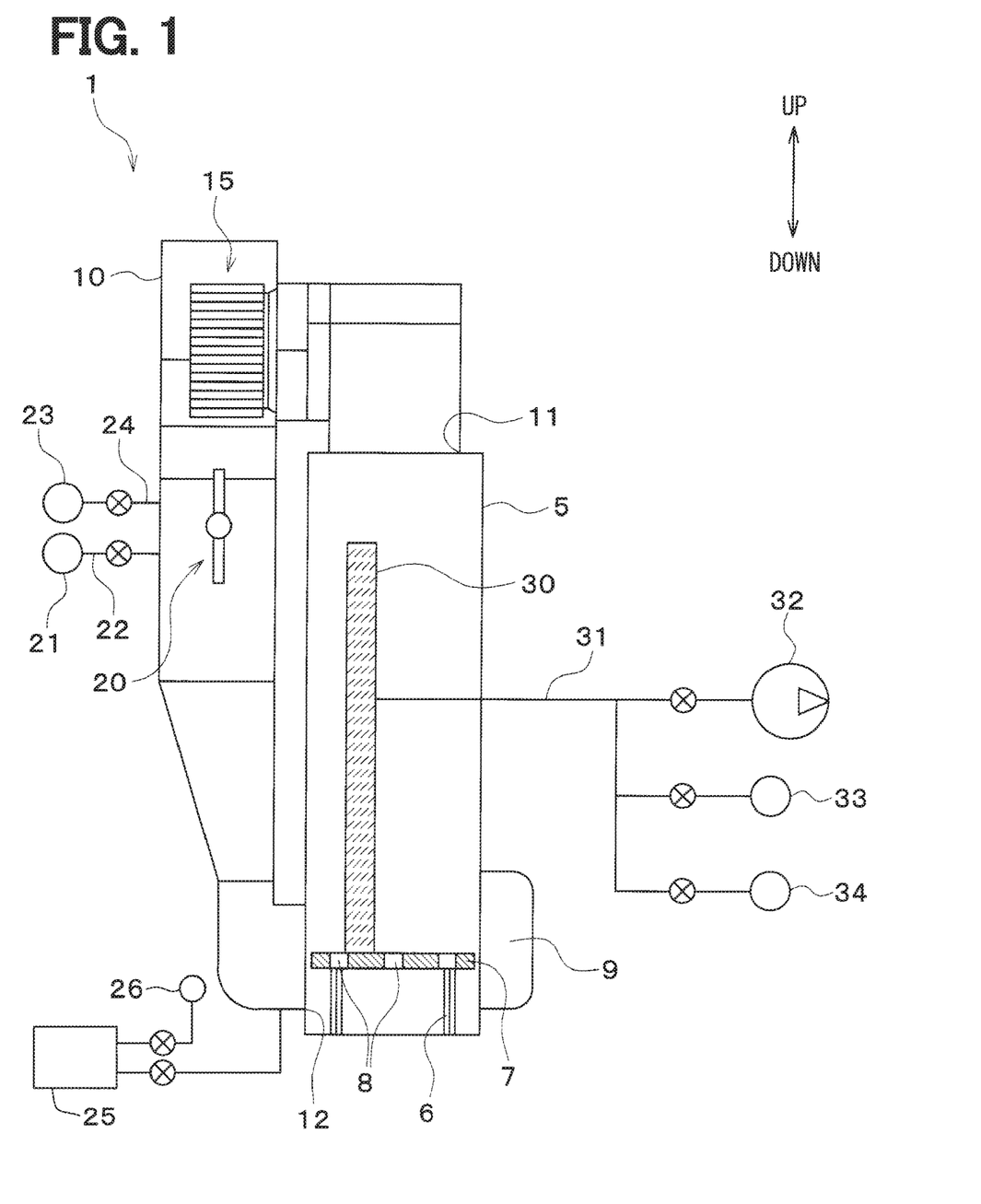
FIG. 1 is a schematic configuration diagram of a leakage inspection device according to an embodiment.

A leakage inspection device 1 according to the present embodiment is used for a leakage inspection for inspecting airtightness of an inspection object 30, which is a product required to be airtight. As shown in FIG. 1, the leakage inspection device 1 includes a circulation passage 10, a blower 15, and a detector 25. The detector 25 is connected to a detector inlet 26. An on-off valve is disposed between the detector 25 and the detector inlet 26. An on-off valve is disposed between the detector 25 and the leakage inspection device 1.

In the present embodiment, a heat exchanger is used as the inspection object 30. There are multiple sizes of heat exchangers different from each other in their applications, performance, and the like. The leakage inspection device 1 is configured to be able to inspect the airtightness of each of the inspection objects 30 which are heat exchangers with plural sizes.

In the leakage inspection device 1, the inspection object 30 is disposed in the inspection chamber 5, and the tracer gas is pressurized and sealed in the inspection object 30. In this embodiment, helium gas lighter than air is used as the tracer gas. The airtightness of the inspection object 30 is evaluated to determine the acceptability of the airtightness by detecting the tracer gas leaked from the inspection object 30 with the detector 25 inside the inspection chamber 5 which has the atmospheric pressure.

First, the configuration of the leakage inspection device 1 according to the present embodiment will be described in detail with reference to FIG. 1. The up-down direction in FIG. 1 indicates the up-down direction in the state where the leakage inspection device 1 is installed.

As shown in FIG. 1, an inspection chamber 5 having a box-like shape is disposed in the leakage inspection device 1. The inspection chamber 5 is formed in a substantially rectangular shape elongated in the vertical direction, and has a door (not shown) on one side surface thereof. The inspection object 30 can be housed inside the inspection chamber 5 by opening the door.

The inspection chamber 5 is configured to house the largest size heat exchanger among the heat exchangers to be inspected. That is, one heat exchanger is placed inside of the inspection chamber 5, of heat exchangers in plural sizes.

A mounting table 6 is disposed inside the inspection chamber 5. A flat plate 7 supporting the inspection object 30 from below is disposed on the top of the mounting table 6. The flat plate 7 is disposed inside the inspection chamber 5 from the door in a state where the inspection object 30 is placed on the top of the flat plate 7.

As shown in FIG. 1, the flat plate 7 on the mounting table 6 has through holes 8, and each of the through holes 8 penetrates in the thickness direction of the flat plate 7. Accordingly, gas flow F is permitted to flow in the vertical direction inside the inspection chamber 5 through the through holes 8. The flat plate 7 may be made of a plate-like member formed in a mesh shape, a plate-like punching metal, or the like.

A direction changer 9 is disposed on one side of the inspection chamber 5. The direction changer 9 is disposed at a position facing the blowout port 12 described later, and is configured to change the flow direction of the gas flow F blown out from the blowout port 12 into the inspection chamber 5.

Figure 3:
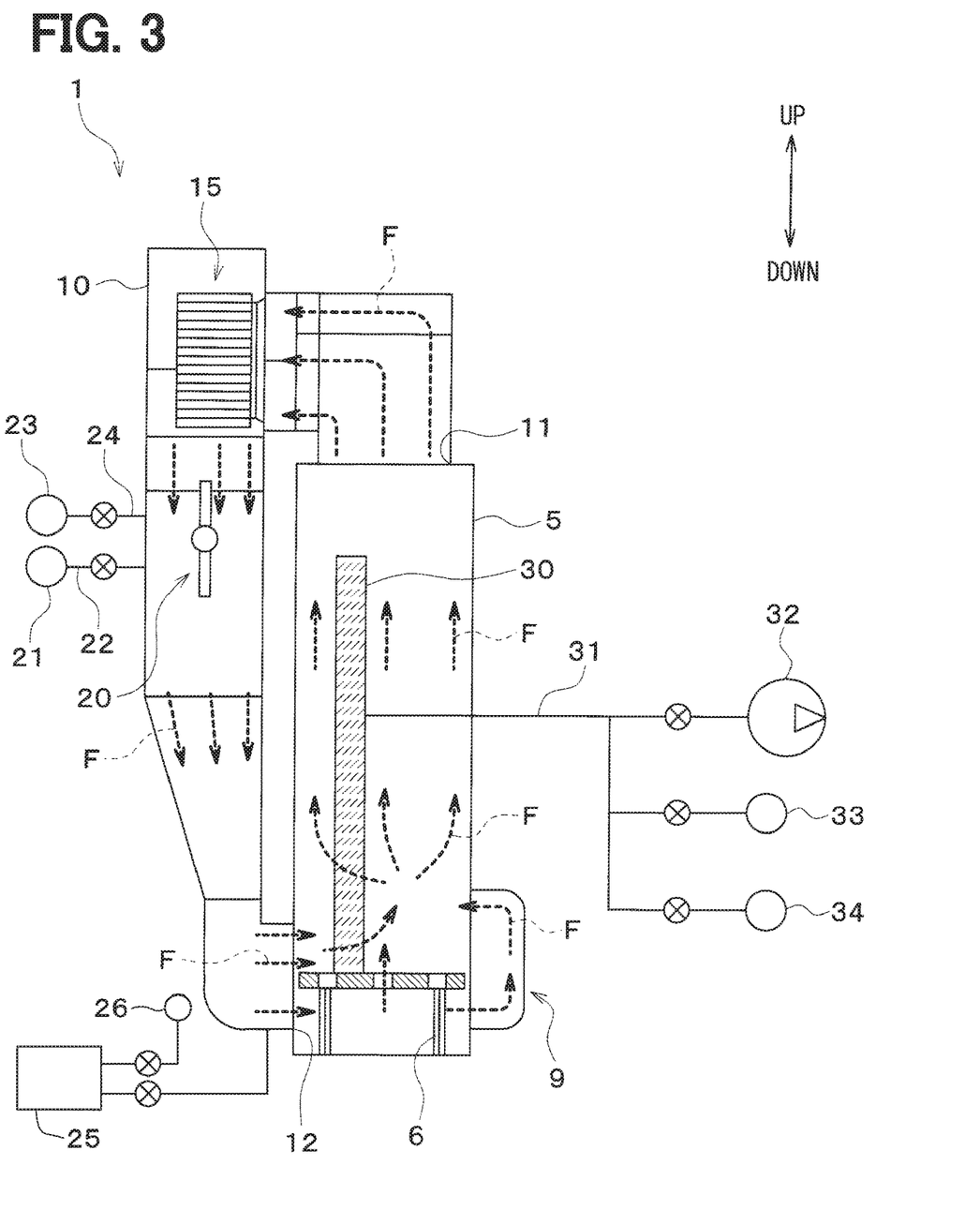
FIG. 3 is an explanatory view illustrating a gas flow at the time of circulation operation in the leakage inspection device.

As shown in FIG. 3, the edge part of the direction changer 9 is formed in curved surface shape, and the flow direction of the gas flow F reached the direction changer 9 is converted in the opposite direction by guiding the gas flow F by the curved surface.

As shown in FIG. 1, the leakage inspection device 1 has the circulation passage 10. The circulation passage 10 connects the suction port 11 disposed on the upper surface of the inspection chamber 5 and the blowout port 12 disposed on one side surface of the lower portion of the inspection chamber 5.

The circulation passage 10 is formed to be long in the vertical direction along the inspection chamber 5 having a rectangular shape which is long in the vertical direction, and is configured by, for example, a duct.

A blower 15 is disposed inside the upper portion of the circulation passage 10. The blower 15 is an electric blower that drives a centrifugal multiblade fan by an electric motor, and circulates the gas inside the inspection chamber 5 via the inspection chamber 5 and the circulation passage 10. The blower 15 can stir the gas by rotating the centrifugal multiblade fan when the gas is blown.

The blower 15 sucks in the gas inside the inspection chamber 5 from the suction port 11, blows the inside of the circulation passage 10 toward the blowout port 12, and blows the gas into the inspection chamber 5. Inside the inspection chamber 5, the gas blown out from the blowout port 12 disposed at the lower part of the inspection chamber 5 flows toward the suction port 11 disposed at the upper surface of the inspection chamber 5.

As described above, since the suction port 11 is disposed on the upper surface of the inspection chamber 5, the gas blown out from the blowout port 12 located below flows upward in the inspection chamber 5 and is drawn into the circulation passage 10 by the operation of the blower 15.

Since the blowout port 12 is disposed on one side in the lower part of the inspection chamber 5, the gas flowing down the circulation passage 10 by the operation of the blower 15 has a flow component in the horizontal direction, when being blown into the inspection chamber 5.

As shown in FIG. 1, a flow path switching unit 20 is disposed on the lower side of the blower 15 in the circulation passage 10 (that is, downstream of the blower 15 in the blowing direction). The flow path switching unit 20 is configured to have a plate-like member that can close the internal flow path of the circulation passage 10. The plate-like member of the flow path switching unit 20 is arranged to be changeable between an open state (see FIG. 3) in which the internal flow path of the circulation passage 10 is opened and a closed state (see FIG. 4) in which the internal flow path of the circulation passage 10 is blocked.

An intake port 21 is connected to the circulation passage 10 via an intake passage 22 on the downstream side of the plate-like member of the flow path switching unit 20 in the closed state, in the blowing direction. The intake port 21 communicates with outside of the leakage inspection device 1. Therefore, the leakage inspection device 1 can take outside air into the inspection chamber 5 and the circulation passage 10 via the intake port 21 and the intake passage 22.

Further, an exhaust port 23 is connected to the circulation passage 10 via an exhaust passage 24 on the upstream side of the plate-like member of the flow path switching unit 20 in the closed state, in the blowing direction. The exhaust port 23 communicates with outside of the leakage inspection device 1 at a position away from the intake port 21. Therefore, the leakage inspection device 1 can exhaust the gas inside the inspection chamber 5 and the circulation passage 10 to the outside through the exhaust port 23 and the exhaust passage 24.

In each of the intake passage 22 and the exhaust passage 24, an on-off valve is disposed. it is possible to prohibit the intake of the outside air through the intake passage 22 and the exhaust to the outside of the leakage inspection device 1 through the exhaust passage 24 by closing each of the on-off valves. That is, the flow path switching unit 20, the intake port 21, the intake passage 22, the exhaust port 23, and the exhaust passage 24 according to the present embodiment function as a flow path switching unit.

A detector 25 is disposed downstream of the blower 15 and the flow path switching unit 20 in the circulation passage 10 in the blowing direction. The detector 25 can measure the concentration of tracer gas (i.e., helium gas) contained in the gas circulating in the circulation passage 10, and is configured of, for example, a helium leak detector. The detector 25 functions as a detection unit.

The detector 25 measures the concentration of helium gas by sampling from the gas circulating in the circulation passage 10 at a position separated from the blower 15 by a predetermined distance (for example, about 80 cm) downstream of the blower 15.

The predetermined distance is set for sufficiently stirring by the rotation of the impeller in the blower 15, for example, according to the size range of the inspection object 30 between the minimum size and the maximum size, the configuration of the blower 15, and the air blowing capacity.

As shown in FIG. 1, the detector 25 according to the present embodiment samples gas circulating in the circulation passage 10 around the blowout port 12 of the circulation passage 10 (that is, a position immediately before the blowout port 12), and measures the concentration of helium gas.

By arranging in this manner, it is possible to sufficiently advance the stirring of the gas by the rotation of the centrifugal multiblade fan in the blower 15 until the sampling by the detector 25. That is, the leakage inspection device 1 can measure the concentration of the helium gas by the detector 25 in a state where the distribution of the helium gas becomes uniform.

The inspection object 30 is a product which has an internal space and is required to be airtight, and a heat exchanger is used as the inspection object 30 in the present embodiment. The heat exchanger has a core portion formed in a panel shape by a plurality of tubes and fins. Heat is exchanged between fluid flowing in the inner space of the core portion and fluid flowing outside the core portion to heat or cool the fluid. The heat exchanger has various sizes depending on the required use and performance.

As shown in FIG. 1, a vacuum pump 32, a tracer gas supply unit 33, and an air supply unit 34 are connected to the inspection object 30 disposed inside the inspection chamber 5 via a connection pipe 31.

The vacuum pump 32 can evacuate the gas in the internal space of the inspection object 30 and put the internal space in a vacuum state. The on-off valve is positioned at the connection pipe 31 connected to the vacuum pump 32.

The tracer gas supply unit 33 is connected via the connection pipe 31 in order to supply the helium gas which is the tracer gas to the internal space of the inspection object 30, and to recover the helium gas from the internal space. The connection pipe 31 connected to the tracer gas supply unit 33 is provided with an on-off valve.

The air supply unit 34 is connected to the connection pipe 31 in order to supply air to the internal space of the inspection object 30 and return the inspection object 30 to have the atmospheric pressure. The connection pipe 31 connected to the air supply unit 34 is provided with an on-off valve.

According to the leakage inspection device 1, the state of the internal space of the inspection object 30 can be adjusted to an appropriate state according to the process of the leakage inspection by controlling the vacuum pump 32 and the on-off valves.

Next, a leakage inspection method using the leakage inspection device 1 according to the present embodiment will be described with reference to FIG. 2. In the initial state, the flow path switching unit 20 in the leakage inspection device 1 is in the open state, and the on-off valves in the intake passage 22 and the exhaust passage 24 are in the closed state.

In the leakage inspection method according to the present embodiment, first, a preparation step is performed prior to the start of the leakage inspection. The preparation step also includes a placement step. Specifically, in the preparation step, first, the operation of the blower 15 is started. Thereby, the gas inside the inspection chamber 5 is sucked into the circulation passage 10 via the suction port 11 and reaches the blower 15.

In the blower 15, the gas stirred by the rotation of the centrifugal multiblade fan flows downward in the circulation passage 10. At this time, since the flow path switching unit 20 is in the open state, the gas flows toward the blowout port 12 while advancing the stirring of the gas.

The gas blown out from the blowout port 12 into the inspection chamber 5 flows from the bottom to the top inside the inspection chamber 5 toward the suction port 11 by the operation of the blower 15. Thus, the leakage inspection device 1 can perform a circulation operation to generate the gas flow F in which the gas circulates through the inspection chamber 5 and the circulation passage 10.

Then, the inspection object 30 placed on the flat plate 7 is disposed inside the inspection chamber 5 from the door. This process corresponds to the placement step. When the door of the inspection chamber 5 is closed and the inspection object 30 is put in the inspection chamber 5, the connection pipe 31 is connected to the inspection object 30.

Thereafter, the operation of the vacuum pump 32 is started in a state where the connection pipe 31 is connected to the inspection object 30. Thereby, as shown in FIG. 2, the internal space of the inspection object 30 is depressurized from the atmospheric pressure Po.

After the circulation operation by the blower 15 is continued for a predetermined time, the background (BG) concentration Co of the helium gas at the present time is measured by the detector 25. After confirming the measured background concentration Co, the preparation step including the placement step is ended.

In the present embodiment, it is assumed that the circulation process is started by the start of the circulation operation by the blower 15, and the circulation process is ended when the circulation operation is ended. That is, in the present embodiment, the circulation process is continued at the end time point of the preparation step.

In the leakage inspection method according to the present embodiment, the gas filling step is performed subsequent to the preparation step. Specifically, after the operation of the vacuum pump 32 is stopped and the on-off valve of the connection pipe 31 connected to the vacuum pump 32 is closed, the on-off valve of the connection pipe 31 connected to the tracer gas supply unit 33 is opened.

The internal space of the inspection object 30 is filled with helium gas which is a tracer gas. As shown in FIG. 2, due to the filling of the interior space with helium gas, the pressure in the interior space of the inspection object 30 rises from a negative pressure to the atmospheric pressure Po, and becomes a predetermined inspection pressure Pe that indicates a state where the inside space is filled with helium gas.

In the leakage inspection method according to the present embodiment, subsequently, a standby step is performed. The standby step is a step of waiting until the pressure of the internal space of the inspection object 30 becomes the predetermined inspection pressure Pe after starting the filling of the helium gas in the gas filling step.

In this standby step, the inspection object 30 is continuously connected to the tracer gas supply unit 33 from the start of the gas filling step, and is in a state in which helium gas is being filled. If there is a leak portion in the inspection object 30, the helium gas continues to leak inside the inspection chamber 5.

In other words, when there is a leak in the inspection object 30, the standby step is a step of waiting until the leakage amount per unit time of the helium gas becomes stable regardless of the size of the inspection object 30.

Specifically, in the standby step, a subsequent step is waited until a predetermined waiting time Tw has elapsed from the timing when the filling of the helium gas is started. The waiting time Tw is determined so that the leakage inspection can be performed with stable accuracy even when any heat exchanger of a plurality of sizes is disposed inside the inspection chamber 5. This point will be described later with reference to the drawings.

When the standby step is completed, the detection process is performed. First, the first measurement of the concentration of helium gas is performed. Here, in the detection process, a large leak check is performed as a step (PRE) before measuring the helium concentration in the inspection chamber 5. When the leak amount of the inspection object 30 is excessive, a high concentration helium gas flows into the detector 25. If the helium gas concentration in the detector 25 is not sufficiently reduced until the next measurement, the next measurement value may be affected. The large leak check is performed for the purpose of preventing high concentration helium gas from affecting the next measurement value. Specifically, by opening the on-off valve between the detector inlet 26 communicating with the outside and the detector 25, the concentration is lowered by mixing outside air and the helium gas flowing from the inspection chamber 5. such that the helium gas of high concentration is prevent from remaining in the detector 25. Even when the concentration is lowered, if the helium gas concentration exceeds a preset value preset for large leak confirmation, the detection process is ended halfway without performing the first measurement. When the helium gas concentration is less than the set value, the on-off valve between the detector inlet 26 and the detector 25 is closed, and the first measurement is performed. Here, the blower 15 continues the circulation operation during the detection process. The valve of the tracer gas supply unit 33 connected to the inspection object 30 via the connection pipe 31 is closed after the pressure in the internal space of the inspection object 30 reaches the inspection pressure Pe.

Therefore, when there is a leak portion in the inspection object 30, helium gas continues to leak inside the inspection chamber 5, due to the pressure difference between the pressure in the internal space of the inspection object 30 having the predetermined inspection pressure Pe after the completion of the filling and the atmospheric pressure of the inspection chamber 5 which is the external space. The leaked helium gas is mixed with the gas inside the inspection chamber 5, and circulates in the inspection chamber 5 and the circulation passage 10.

Figure 4:
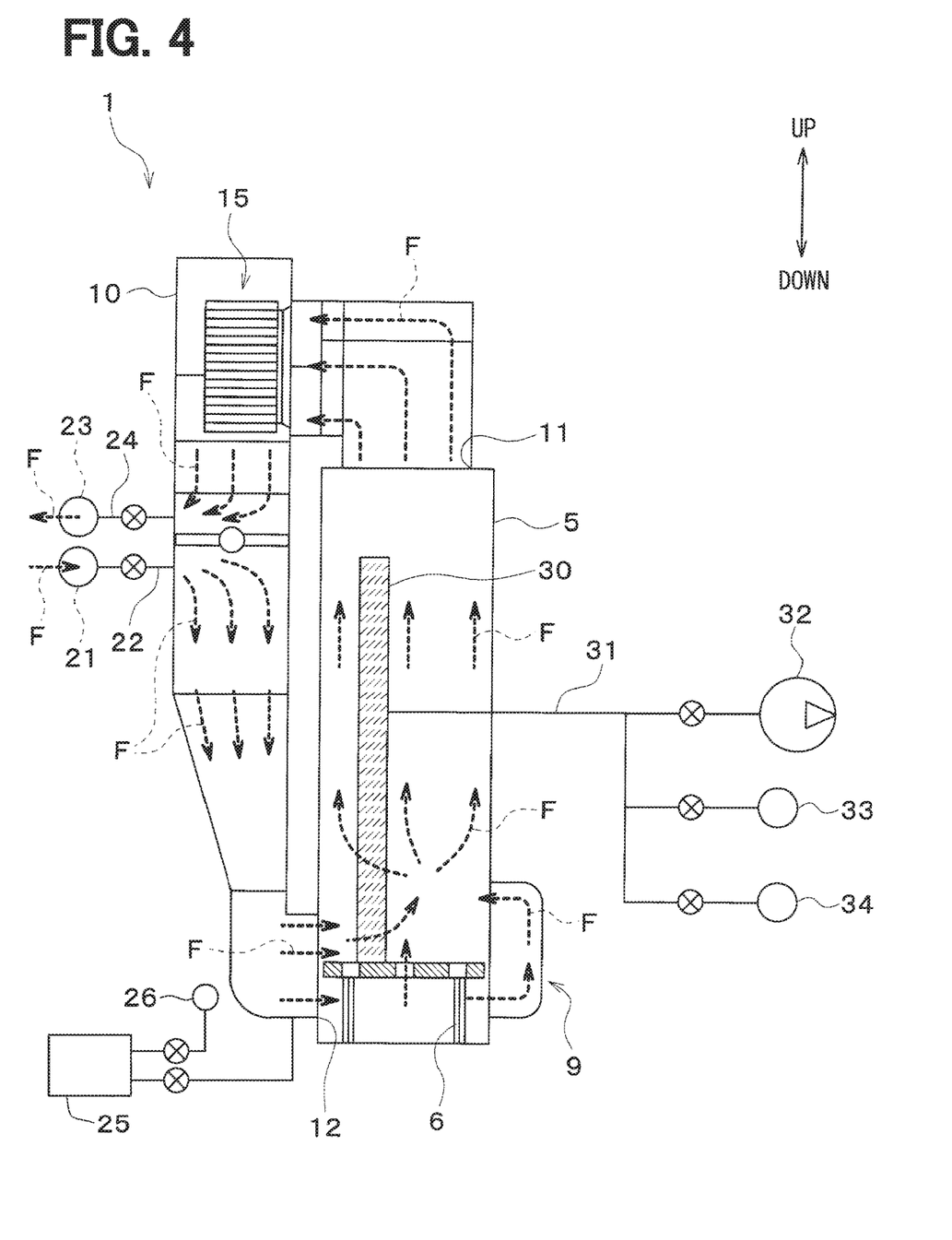
FIG. 4 is an explanatory view illustrating a gas flow at the time of cleaning in the inspection device.

The helium gas leaked from the inside of the inspection object 30 is lighter than air, and thus flows upward inside the inspection chamber 5. As shown in FIG. 4, the gas flow F blown out from the blowout port 12 is also directed to the suction port 11 disposed on the upper surface of the inspection chamber 5 by the operation of the blower 15. Therefore, according to the leakage inspection device 1, the gas inside the inspection chamber 5 containing helium gas is efficiently led to the suction port 11 and the blower 15.

The blower 15 sucks the gas inside the inspection chamber 5 from the suction port 11 and blows to the blowout port 12 by rotating the centrifugal multiblade fan. Due to the rotation of the centrifugal multiblade fan in the blower 15, the gas inside the inspection chamber 5 and the helium gas are agitated to flow toward the blowout port 12.

In the circulation passage 10, the agitation of the gas in the inspection chamber 5 and the helium gas progresses as flowing from the blower 15 downward in the blowing direction. As described above, the detector 25 measures the concentration of the helium gas contained in the gas circulating in the circulation passage 10 at a position separated by a predetermined distance or more. Therefore, the inspection device 1 can make the concentration of helium gas in the gas uniform by the sufficient stirring.

Thereby, according to the leakage inspection device 1 and the leakage inspection method, the concentration of helium gas can be measured with the same measurement value, with respect to the same leakage amount of helium gas, regardless of the size of the inspection object 30 or the leakage position, direction and size in the inspection object 30. Thereby, according to the leakage inspection device 1 and the leakage inspection method, compared with a conventional atmospheric pressure type leakage inspection device, the inspection accuracy is improved by reducing the measurement error of tracer gas.

Thereafter, the gas flowing down the circulation passage 10 is blown out from the blowout port 12 into the inspection chamber 5. Since the blowout port 12 is disposed on one side of the lower portion of the inspection chamber 5, the gas flow blown out from the blowout port 12 has a flow component in the horizontal direction.

As shown in FIG. 3, the direction changer 9 is disposed to face the blowout port 12 in the inspection chamber 5 of the leakage inspection device 1. The direction changer 9 changes the flow direction of the gas flow F blown out from the blowout port 12.

Specifically, the direction changer 9 converts the horizontal component of the gas flow F from a flowing direction from the blowout port 12 to the direction changer 9 to a flowing direction from the direction changer 9 to the blowout port 12. The vertical component of the gas flow F in this case is basically a direction from the bottom to the top.

Thus, by disposing the direction changer 9 at a position facing the blowout port 12, a gas flow F can have various orientations as the horizontal component around the inspection object 30 disposed inside the inspection chamber 5.

As a result, regardless of the position of the leaked portion of the inspection object 30, the helium gas can be guided to the suction port 11 by the gas flow F without staying inside the inspection chamber 5. That is, the leakage inspection device 1 can appropriately measure the helium gas by disposing the direction changer 9, regardless of the leakage position in the inspection object 30.

Further, since the flat plate 7 of the mounting table 6 has the plural through holes 8, the gas flow F flowing upward from the lower side inside the inspection chamber 5 is not blocked by the flat plate 7 of the mounting table 6. Therefore, the gas flow F does not stay in the lower part of the inspection chamber 5.

As shown in FIG. 3, according to the leakage inspection device 1, the single blower 15 forms a circulating flow in one direction inside the inspection chamber 5 and the circulation passage 10. Therefore, the helium gas leaked from any position of the inspection object 30 always flows into the circulation passage 10 from the suction port 11 and is stirred by the blower 15. The well-stirred gas flows downward through the circulation passage 10 in the state where the concentration of helium gas is made uniform, and is measured by the detector 25.

Thereby, according to the leakage inspection device 1, the concentration of helium gas can be measured in the stable state by the stirring by the blower 15, irrespective of the leak position of the inspection object 30.

That is, the leakage inspection device 1 can measure the same measured value as long as the leakage amount of the helium gas is the same regardless of the size of the inspection object 30, the position of the leaked portion, and the orientation of the leaked portion.

Thus, after measuring the first-time concentration of the helium gas (hereinafter referred to as the first measured concentration Ca), the process waits for a passage of a fixed period, and the second-time concentration of the helium gas (hereinafter referred to as the second measured concentration Cb) is measured. It is possible to evaluate the concentration change of the helium gas over time, by measuring the concentration of the helium gas twice, to improve the evaluation accuracy of the airtightness.

The second-time helium gas concentration measurement is the same as the first-time helium gas concentration measurement described above, except that the timing to execute is after waiting for the elapse of a fixed time after the first measurement. Before the helium gas concentration measurement, as in the first time, a large leak check is performed as a previous (PRE) step. The description of the second-time helium gas concentration measurement is omitted. The detection process is ended upon completion of the first-time and second-time helium gas concentration measurements.

When the detection step is completed, a determination step is performed. Specifically, in the present embodiment, the first-time measurement concentration Ca is subtracted from the second-time measurement concentration Cb to calculate the leakage amount of helium gas per a fixed time. It is determined whether the result of leakage inspection is successful or not by comparing the calculated leakage amount of helium gas with a reference leakage amount as a criterion for determining the presence or absence of air tightness.

Specifically, when the calculated leakage amount of helium gas is smaller than the reference leakage amount, it is determined that the leakage inspection is passed. When the calculated leakage amount of helium gas is more than or equal to the reference leakage amount, the leakage inspection is not passed. That is, the condition "the calculated leakage amount of helium gas is smaller than the reference leakage amount" is an example of a determination condition.

Thus, the leakage inspection according to the present embodiment ends when the determination step ends. The cleaning step is performed as a post-process after the determination step. In the cleaning step, the helium gas filled in the inspection object 30 is recovered by the tracer gas supply unit 33. Thereafter, air is supplied to the internal space of the inspection object 30 via the connection pipe 31 and the air supply unit 34, and the internal space of the inspection object 30 is returned to the atmospheric pressure state.

Then, in the inspection chamber 5 and the circulation passage 10, as shown in FIG. 4, the plate-like member of the flow path switching unit 20 is closed while the operation of the blower 15 is continued, and the on-off valve is opened in the intake passage 22 and the exhaust passage 24.

Thus, the gas flow F in the circulation passage 10 is blocked by the plate-like member of the flow path switching unit 20. At the same time, the exhaust port 23 is connected to the upper portion of the circulation passage 10 via the exhaust passage 24, and the intake port 21 is connected to the lower portion of the circulation passage 10 via the intake passage 22.

In this case, the gas in the inspection chamber 5 is sucked into the circulation passage 10 from the suction port 11 by the operation of the blower 15, and is blown toward the flow path switching unit 20. The gas flow F blown by the blower 15 is directed to the exhaust port 23 via the exhaust passage 24 at the upstream side of the flow path switching unit 20. Therefore, in the leakage inspection device 1, the gas in the inspection chamber 5 can be exhausted from the exhaust port 23 to the outside of the leakage inspection device 1.

Further, the gas in the inspection chamber 5 is sucked into the suction port 11 with the operation of the blower 15, whereby the lower gas in the circulation passage 10 moves from the blowout port 12 into the inspection chamber 5. Further, in conjunction with this, air outside the leakage inspection device 1 is drawn into the lower part of the circulation passage 10 via the intake port 21 and the intake passage 22.

Thereby, as shown in FIG. 4, in the cleaning step, air outside the leakage inspection device 1 is made to flow into the lower part of the circulation passage 10 through the intake port 21 and the intake passage 22, and the air is exhausted to the outside from the exhaust port 23 through the inside of the inspection chamber 5, the upper portion of the circulation passage 10 and the exhaust passage 24.

As a result, the leakage inspection device 1 can exhaust the gas in the inspection chamber 5 having a high concentration of helium gas to the outside of the leakage inspection device 1 by replacing the outside air by executing the cleaning process. Thus, the inspection chamber 5 can be quickly cleaned to the condition before the leakage inspection.

Then, the inspection object 30 subjected to the leakage inspection is taken out together with the flat plate 7 through the door of the inspection chamber 5 in a state where the operation of the blower 15 is continued. The cleaning process is completed by removing the inspection object 30.

After the end of the cleaning process, the operation of the blower 15 may be simply stopped, or the start of the leakage inspection for the next inspection object 30 may be waited in the state where the operation of the blower 15 is continued.

Figure 5:
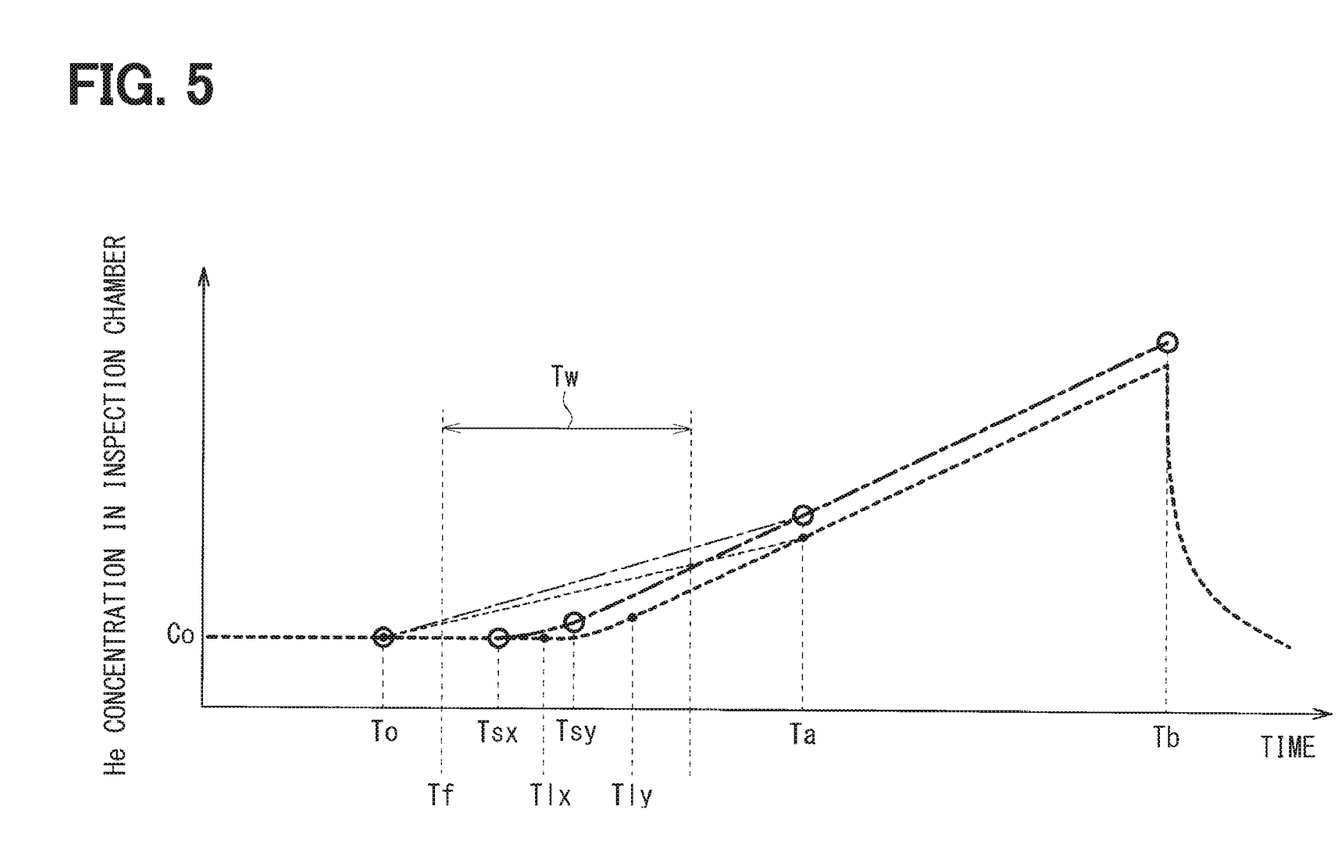
FIG. 5 is an explanatory view of a waiting time in the leakage inspection method according to the embodiment.

Subsequently, the waiting time Tw in the standby step according to the present embodiment will be described with reference to FIG. 5. As described above, in the present embodiment, heat exchangers of a plurality of sizes can be used as the inspection object 30. FIG. 5 is explained, for example, in a case where the heat exchanger of the largest size and the heat exchanger of the smallest size are used as the inspection object.

FIG. 5 is a graph in which a broken line shows the concentration change of helium gas in the inspection chamber 5 in the case of using the heat exchanger of the largest size, and a single chain line shows the concentration change of the helium gas in the inspection chamber 5 in the case of using the heat exchanger of the smallest size, among the heat exchangers of a plurality of sizes. Each heat exchanger in this case has a leak portion with the same leak amount.

As shown by the broken line in FIG. 5, when the gas filling step is started after the time To when the detection of the background concentration Co is completed, the inner space of the heat exchanger of the smallest size is filled with helium gas.

In the case of the heat exchanger of the smallest size, the helium gas leaks from the inner space at an early stage and is detected by the detector 25 because the inner space is also the smallest. When the heat exchanger of the smallest size is used, the time when the helium gas is detected by the detector 25 is taken as time Tsx.

Even after time Tsx, the helium gas is continuously filled in the internal space of the heat exchanger of the minimum size from the tracer gas supply unit 33. Therefore, the pressure in the internal space gradually rises, and reaches the predetermined inspection pressure Pe. The time when this internal pressure becomes the inspection pressure Pe is taken as time Tsy.

At time Tsy, as the pressure of the internal space in the heat exchanger is higher than in the case of time Tsx, more helium gas leaks out from the internal space of the heat exchanger of the smallest size per unit time than at time Tsx.

Therefore, the concentration of helium gas in the inspection chamber 5 at time Tsy exhibits a higher value than that at time Tsx.

On the other hand, in the case of the heat exchanger of the largest size, the interior space is also the largest. At time Tsx, helium gas does not leak from the interior space. When time further passes, the detector 25 will detect the helium gas. When the heat exchanger of the largest size is used, the time when the helium gas is detected by the detector 25 is taken as time Tlx.

Even after time Tlx, the helium gas is continuously filled from the tracer gas supply unit 33 into the internal space of the heat exchanger of the largest size. The pressure of the internal space gradually increases, and reaches the predetermined inspection pressure Pe. The time when the internal pressure of the largest size heat exchanger reaches the inspection pressure Pe is taken as time Tly. The time Tly is later than the time Tsy because the interior space of the largest size heat exchanger is larger than the interior space of the smallest size heat exchanger.

At time Tly, the pressure of the internal space in the heat exchanger is higher than in the case of time Tlx, so more helium gas leaks out from the internal space of the largest size heat exchanger per unit time than at time Tlx. Therefore, the concentration of helium gas in the inspection chamber 5 at time Tly is a higher than that at time Tlx.

Here, the relationship between the accuracy of the detection process in the leakage inspection method according to the present embodiment and the evaluation index will be described. First, a case of using the background concentration Co detected at time To and the first-time measurement in the detection step (that is, time Ta in FIG. 5) will be examined.

In this case, since the size of the internal space is different between the largest size heat exchanger and the smallest size heat exchanger, a difference occurs in the first-time helium gas concentration at time Ta. In contrast, the background concentration Co at time To is basically a common value regardless of the size of the heat exchanger.

For this reason, the difference in size of the heat exchanger as the inspection object 30 appears as a difference in the first-time measured helium gas concentration. An error caused by the size difference of the inspection object 30 occurs in the measurement result of the helium gas concentration. For this reason, when a leakage inspection is performed on plural inspection objects 30 of different sizes, it may not be appropriate to use the background concentration Co as an evaluation index.

Here, in the case of the heat exchanger of the smallest size, the increase in concentration of helium gas per unit time is unstable until the time Tsy passes. As shown in FIG. 5, after the pressure in the inner space becomes the inspection pressure Pe, the concentration of helium gas per unit time exhibits a stable behavior. That is, after the time Tsy, the change of the concentration of the helium gas over time exhibits linearity including the first-time concentration measurement (that is, the time Ta) and the second-time concentration measurement.

Similarly, even in the case of the largest size heat exchanger, the increase in concentration of helium gas per unit time is unstable until the time Tly passes. As shown in FIG. 5, after the pressure in the inner space becomes the inspection pressure Pe, the concentration of helium gas per unit time exhibits a stable behavior. That is, after the time Tly, the change of the concentration of the helium gas over time exhibits linearity including the first-time concentration measurement (that is, the time Ta) and the second-time concentration measurement.

As shown in FIG. 5, even with heat exchangers of different sizes, the increase in concentration of helium gas per unit time tends to show the same value after the pressure in the inner space becomes the inspection pressure Pe. That is, even for heat exchangers of different sizes, the air tightness can be evaluated with the same evaluation index, to perform a leakage inspection with high accuracy.

Therefore, in the present embodiment, the waiting time Tw from the time Tf at which the filling of the helium gas is started to the start of the detection process is set larger than or equal to the time Tly at which the pressure in the internal space becomes the inspection pressure Pe for the heat exchanger of the largest size.

In the case of a heat exchanger smaller than the largest size, the pressure of the inner space reaches the inspection pressure Pe before the time Tly. Therefore, the waiting time Tw is set as described above to be larger than or equal to the time required for the pressure in the internal space to reach the inspection pressure Pe, relative to any size heat exchanger. That is, the concentration of helium gas can be measured in a state where the concentration change is stable after waiting for the waiting time Tw.

As a result, according to the leakage inspection method, it is possible to perform the leakage inspection with maintaining sufficient accuracy in any size heat exchangers by waiting for the elapse of the waiting time Tw in the standby step.

As described above, according to the leakage inspection device 1 of the present embodiment, the gas in the inspection chamber 5 including the helium gas leaked from the inspection object 30 is transferred to the inspection chamber 5 and the circulation passage 10 by the blower 15. Therefore, helium gas can be passed around the detector 25 as shown in FIG. 3.

Thus, the leakage inspection device 1 can detect the helium gas by the detector 25 while suppressing the influence of the size of the inspection object 30 to a low level while the inspection object 30 can be accommodated in the inspection chamber 5, such that the leakage inspection of the inspection object 30 can be performed. That is, the leakage inspection device 1 can perform the leakage inspection of the inspection object 30 of various sizes.

According to the leakage inspection device 1, since the blower 15 is positioned in the circulation passage 10, the gas inside the inspection chamber 5 drawn from the suction port 11 can be stirred by the blower 15. Furthermore, since the detector 25 measures helium gas at a position separated from the blower 15 toward the blowout port 12 by a predetermined distance or more, according to the leakage inspection device 1, the measurement by the detector 25 can be performed in a state where the stirring of gas blown by the blower 15 is further advanced.

That is, according to the leakage inspection device 1, it is possible to blow the gas to the detector 25 in a state of being stirred so that the distribution of helium gas becomes uniform. Therefore, it is possible to suppress the influence of the size of the inspection object 30 relative to the inspection chamber 5 to maintain the detection accuracy by the detector 25 and the inspection accuracy of the leakage inspection at a certain level or more.

As shown in FIG. 1, in the leakage inspection device 1, helium gas lighter than air is used as a tracer gas. The suction port 11 is disposed on the upper surface of the inspection chamber 5, and the blowout port 12 is placed on one side of the lower part of the inspection chamber 5.

Thus, the helium gas can be flowed toward the suction port 11 inside the inspection chamber 5 by utilizing the difference in specific gravity between the helium gas and the gas in the inspection chamber 5. That is, retention of helium gas in the inspection chamber 5 can be suppressed.

Further, since the detector 25 is disposed in the circulation passage 10 at a position separated by a predetermined distance or more from the blower 15, the time period taken until the helium gas reaches the detector 25 can be extended. As a result, since the stirring by the blower 15 can be performed for a long time, the concentration measurement of the helium gas can be performed in a sufficiently uniform state, to enhance the inspection accuracy of the leakage inspection.

As shown in FIG. 3 and the like, the direction changer 9 is disposed at a position facing the blowout port 12 in the lower part of the inspection chamber 5. The direction changer 9 converts the horizontal component of the gas flow F from a flow direction from the blowout port 12 to the direction changer 9 to a flow direction from the direction changer 9 to the blowout port 12.

That is, the leakage inspection device 1 generates the gas flow F having various directivity as a horizontal component around the inspection object 30 by arranging the direction changer 9 inside the inspection chamber 5. Helium gas can be properly measured regardless of the leak position of the inspection object 30.

Further, the plural through holes 8 are defined in the flat plate 7 of the mounting table 6 on which the inspection object 30 is mounted in the inspection chamber 5. For this reason, the gas flow F flowing upward inside the inspection chamber 5 can smoothly flow through the through holes 8 and helium gas can be prevented from staying in the lower part of the inspection chamber 5.

Figure 2:
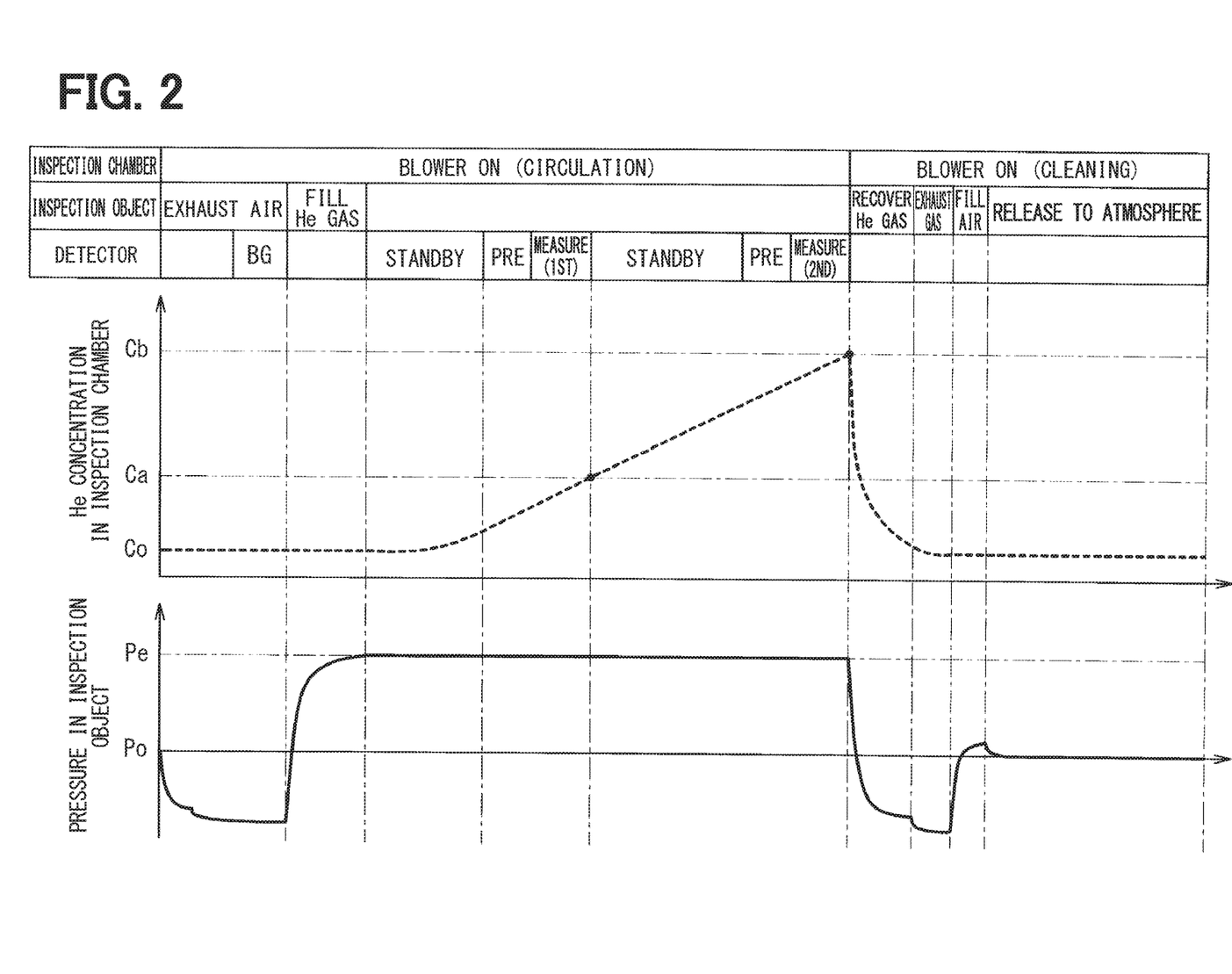
FIG. 2 is an explanatory view illustrating a leakage inspection method by the leakage inspection device according to the embodiment, with status of an inspection chamber and an inspection object.

The leakage inspection method of the present embodiment using the above-described leakage inspection device 1, as shown in FIG. 2, includes the arrangement step, the gas filling step, the circulation step, the detection step and the determination step.

In the detection step of the leakage inspection method, the detector 25 detects helium gas in a state where filling of helium gas into the inspection object 30 and circulation of gas through the circulation passage 10 by operation of the blower 15 are continued.

That is, in the leakage inspection method, the leakage inspection can be performed without involving complicated processes such as replacement of gas inside the inspection object 30 and adjustment of the internal pressure of the inspection object 30. Furthermore, according to the leakage inspection method, the required time of the leakage inspection with respect to one inspection object 30 can be shortened by enabling leakage inspection without involving a complicated process.

In the leakage inspection method, a standby step is performed after the start of a gas filling process and a circulation process, and before a detection process. In the standby step, the gas filling process and the circulation process are continued for the waiting time Tw set longer than the time taken until the pressure in the internal space of the inspection object 30 reaches the inspection pressure Pe.

Thereby, the leak amount of the helium gas which leaks from the inspection object 30 can be stabilized even if the size of the inspection object 30 differs. As a result, even when inspection objects 30 of different sizes are used, the presence or absence of a leak can be appropriately determined, and the inspection accuracy of the leakage inspection can be maintained.

OTHER EMBODIMENTS

Although the embodiment was described, the present disclosure is not limited to the embodiment mentioned above. That is, various improvement changes are possible within the range which does not deviate from the scope of the present disclosure. For example, the above-described embodiments may be arbitrarily combined, or various modifications are possible for the embodiment.

(1) In the embodiment mentioned above, although a heat exchanger is mentioned as the inspection object 30, it is not limited to this mode. A product which has an internal space and airtightness is required can be used suitably as the inspection object 30. Moreover, the inspection object 30 is not limited to the product which has several sizes, and the inspection object 30 may be a product of a single size.

(2) In the leakage inspection device 1 of the embodiment, although the inspection chamber 5 has a rectangular shape long in the vertical direction, it is not limited to this aspect. The inspection chamber 5 may have various appropriate shapes while the inspection object 30 can be housed in the inspection chamber 5. For example, the inspection chamber 5 may have a rectangular shape longer in the horizontal direction.

(3) In the embodiment mentioned above, although the blowout port 12 is positioned in the one side of the lower part of the inspection chamber 5, it is not limited to this aspect. The blowout port 12 can be disposed at various positions in the inspection chamber 5 different from the suction port 11.

For example, the blowout port 12 may be disposed on the lower surface of the inspection chamber 5. In this case, the flow direction of the gas blown out from the blowout port 12 and the flow direction of the gas directed to the suction port 11 inside the inspection chamber 5 can be made to coincide with each other to make the flow smooth.

(4) In the embodiment mentioned above, although the gas flowing through the circulation passage 10 was stirred by the blower 15, another structure may be added for further promoting the stirring of the gas.

For example, a stirring member may be disposed downstream of the blower 15 in the circulation passage 10 in the blowing direction. The stirring member may be plural rod-like members disposed so as to cross the circulation passage 10 or may be an impeller member which is rotated by air blowing from the blower 15.

Moreover, it is also possible to arrange a stirring apparatus downstream of the blower 15 in the blowing direction in the circulation passage 10. The stirring apparatus may be a small-sized fan. In this case, the small-sized fan is disposed with respect to the circulation passage 10 so as to blow gas in a direction intersecting the blowing direction of the blower 15.

According to these configurations, the gas containing helium gas reaches the detector 25 in a more uniformly stirred state. Therefore, the detection accuracy of the leakage inspection can be improved by reducing error by the detector 25 caused by the concentration distribution.

What is claimed is:

1. A leakage inspection device comprising:
an inspection chamber in which an inspection object is disposed to be filled with a tracer gas;

a circulation passage connecting a suction port disposed in the inspection chamber and a blowout port disposed at a position away from the suction port in the inspection chamber with each other;

a blower disposed in the circulation passage to circulate gas by sucking from the inspection chamber through the suction port and by blowing out from the blowout port; and a detector configured to detect the tracer gas leaked from the inspection object and contained in the gas flowing through the circulation passage at a position separated by a predetermined distance or more from the blower toward the blowout port in the circulation passage, wherein the tracer gas is a gas lighter than the gas inside the inspection chamber, the suction port and the blower are disposed at an upper portion of the inspection chamber, the blowout port is disposed at a lower portion of the inspection chamber, the blowout port is disposed so as to blow out the gas in a direction intersecting a flow direction of the gas flowing inside the inspection chamber toward the suction port, and the inspection chamber includes a direction charger at a position facing the blowout port to change the flow direction of the gas blown out from the blowout port.

2. The leakage inspection device according to claim 1, further comprising:

a mounting table disposed in the inspection chamber, the mounting table having a flat plate on which the inspection object is mounted, wherein the flat plate has a plurality of through holes passing through the flat plate in a thickness direction of the flat plate.

3. The leakage inspection device according to claim 1, wherein the tracer gas is detected by the detector in a state where the filling of the tracer gas into the inspection object and the circulation of the gas through the circulation passage by the operation of the blower are continued, and the inspection object is determined to pass the leakage inspection when a predetermined determination condition is satisfied using the tracer gas detected by the detector.

4. The leakage inspection device according to claim 3, wherein the filling of the tracer gas with respect to the inspection object and the circulating of the gas through the circulation passage by the operation of the blower are continued until a pressure of the tracer gas filled in the inspection object becomes a predetermined inspection pressure.

* * * * *